3,282,758
METHOD OF BONDING A SLEEVE TO A CABLE
Ralph G. D'Ascoli, Yonkers, N.Y., assignor, by mesne assignments, to Anaconda Wire and Cable Company, a corporation of Delaware
Filed July 26, 1962, Ser. No. 212,568
1 Claim. (Cl. 156—86)

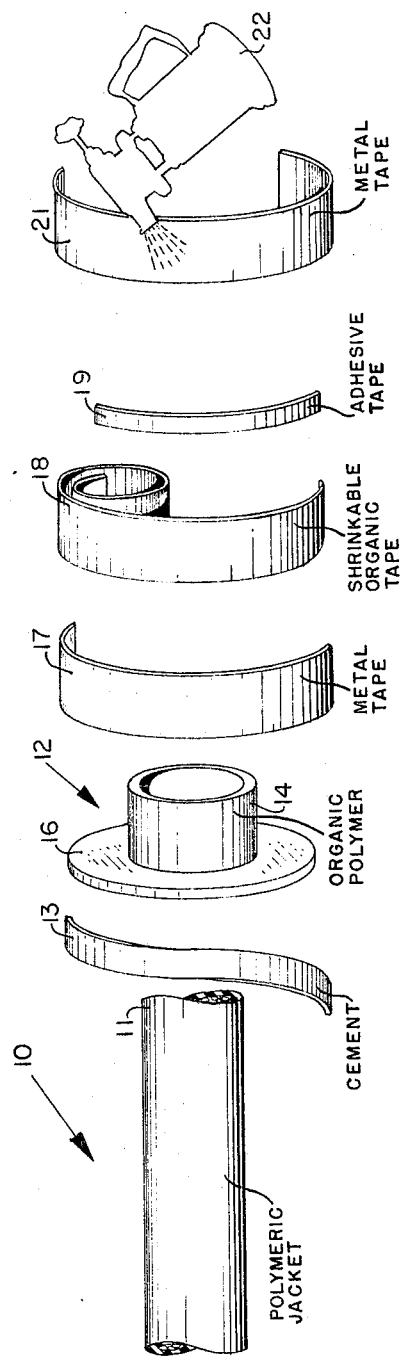
INVENTOR.
RALPH G. D'ASCOLI
BY
*V. F. Volk*
HIS AGENT

My invention relates to apparatus and method of molding and particularly to molding in the field where pressurized equipment is not available.

In the splicing of cables and other articles where heat and pressure are required for a satisfactory splice it is often necessary to make such splices at locations remote from sources of electric power required to operate presses and from sources of pressurized steam and the like. Splices are also often required to be made in cramped locations where compression equipment cannot be maneuvered. A particular case where this is true is in the splicing of pressurized electric cables wherein a vapor-tight seal is required between a cable jacket and a splice box. One method of making such a seal is to cement a flanged sleeve onto the jacket and then clamp the flange of the sleeve in a vapor-tight grip between the plates of the splice box. For such splices to be reliable they should be made with a heat and pressure sensitive cement such as a vulcanizable elastomer or epoxy, or such as the polyethylene cement described in application Serial Number 190,108 filed April 25, 1962, and assigned to the assignee of the present invention.

The application of pressure to heat-sensitive cements is essential to assure uninterrupted contact between the cement and both of the surfaces that are being joined, and to guarantee that no voids remain between the surfaces after the cement has cooled. Various types of portable molds are known for applying pressure by hydraulic or mechanical means during vulcanizing operations but all such known molds or presses are heavy and burdensome and it is an object of my invention to free field personnel from the burden of this equipment. I accomplish this by using a heat-shrinkable tape to apply pressure to the parts being cemented. I have invented a mold for applying simultaneous heat and pressure to an article, comprising a single turn of a metal tape wrapped around the article with a slight overlap and a plurality of turns of heat-shrinkable organic tape such as butyl rubber tape, wrapped over the metal tape. My mold also comprises a second metal tape wrapped over the organic tape and providing means for transferring heat to the organic tape.

I have invented a method of bonding a sleeve to a cable jacket comprising the steps of applying a heat and pressure-sensitive cement between the sleeve and the jacket, wrapping the sleeve with a single turn of metal tape slightly overlapped and wrapping the metal tape with a plurality of layers of heat-shrinkable organic tape. I then wrap a second metal tape over the organic tape and heat the second tape so as to shrink the organic tape and heat the cement. When wrapping the organic tape I preferably extend the wrap over the jacket and bind it down, as with a binding of adhesive tape.

A more thorough understanding of my invention may be gained from the appended drawing.

In the drawing the figure shows an exploded view of the elements of my mold and molding method.

A cable 10 which extends indefinitely in one direction and is cut at the other for the purpose of splicing has a jacket 11 to which it is desired to bond a flanged sleeve 12. When the jacket 11 is comprised of polyethylene or similar olefin based polymer the sleeve 12 is preferably molded of a similar material and they can be bonded with the aforementioned polyethylene cement. Where the jacket is rubber or neoprene suitable vulcanizing cements can be used. The cement is preferably in the form of a strip 13 that can be wrapped around the jacket 11 but is not, of course, limited to this form and may be a paste or liquid. The sleeve 12 has a tubular portion 14 and a flange 16 in making the splice the tube 14 is slid onto the jacket over the wrapping of cement 13. A metal tape 17 long enough to make one wrap around the tube 14 with a slight overlap is then applied. The tape 17 should distribute the heat of the metal and is conveniently made of copper or bronze. I have found that a sheet 10 mils thick performs very satisfactorily. The tape 17 also transmits the molding pressure and should not buckle or otherwise resist contraction. I have found that if only one turn of tape is applied with a slight overlap such as ⅛ inch the edge of the overlapped portion of tape will slide when pressure is applied and permit the loop formed by the tape to shrink onto the tube 14.

The actual pressure producing element of my invention is a shrinkable organic tape 18 having the full width of the tube 14 and metal tape 17 but long enough to make several turns around the cable. For this tape I prefer a vulcanized butyl-rubber tape about 20 mils thick. Other organic materials that shrink when heated are nylon and polyethylene-terephthalate and also polyethylene that has been irradiated to produce heat shrink characteristics. In making my mold the tape 18 is preferably wrapped for 2 full turns over the overlapped tape 17 and then extended laterally wrapped for one turn around the jacket 11. I provide a length 19 of adhesive tape which is applied over that portion of the tape 18 that has been extended over the jacket 11 to hold it in place. Another length 21 of metal tape which may be the same material and thickness as the tape 17 is then wrapped over the tape 18 and retained in place by folding back on itself. A torch 22 is used to heat the tape 21 and a proper temperature can be maintained by the application of temperature indicating crayons to the surface of the metal. I have found that for polyethylene cables a temperature of 400° F, on the outer tape produces a very good splice.

When heat is applied to the tape 21 it should be applied evenly by moving the torch over the entire surface being careful to avoid local overheating. The heat is transferred through the tape 21 to the tape 18 which shrinks and tightens around the tape 21 and tube 14. The heat is transferred through the sleeve to melt the cement 13 which bonds the tube 14 to the jacket 11 under the influence of combined heat and pressure.

By the means and method described I am thus enabled to make an excellent splice without any mechanical press and only a few strips of tape that any serviceman can carry in his kit without discomfort, and by using any convenient heating means such as a torch which is usually available, in any case, for other purposes.

I have invented a new and useful apparatus and method for which I desire an award of Letters Patent.

I claim:

The method of bonding a sleeve to a cable jacket comprising the steps of:

(A) applying a heat and pressure-sensitive cement between said sleeve and said jacket,
(B) wrapping said sleeve with a single turn of metal tape, slightly overlapped,
(C) wrapping said tape with a plurality of layers of heat-shrinkable organic tape,
(D) wrapping over said organic tape a second metal tape, (E) heating said second tape so as to shrink said organic tape and heat said cement.

References Cited by the Examiner

UNITED STATES PATENTS

| | | | |
|---|---|---|---|
| 2,768,105 | 10/1956 | Dittmore et al. | 156—49 |
| 2,930,634 | 3/1960 | Merritt | 156—304 |
| 2,992,457 | 7/1961 | Harrison | 264—230 |
| 2,993,820 | 7/1961 | Marshall | 156—56 |
| 3,035,113 | 5/1962 | Danchuk | 156—49 XR |
| 3,035,114 | 5/1962 | Beeker et al. | 156—49 XR |
| 3,093,448 | 6/1963 | Kirkpatrick et al. | 264—272 |
| 3,159,513 | 12/1964 | Baier | 156—49 |
| 3,160,801 | 12/1964 | Haas et al. | 156—85 |

EARL M. BERGERT, *Primary Examiner.*

J. F. MATHEWS, P. R. WYLIE, *Assistant Examiners.*